(12) United States Patent
 Fogelson et al.

(10) Patent No.: US 11,361,438 B2
(45) Date of Patent: Jun. 14, 2022

(54) TECHNIQUES FOR ANALYZING AND DETECTING EXECUTIONAL ARTIFACTS IN MICROWELL PLATES

(71) Applicant: RECURSION PHARMACEUTICALS, INC., Salt Lake City, UT (US)

(72) Inventors: Benjamin Marc Feder Fogelson, South Salt Lake City, UT (US); Peter McLean, Centerville, UT (US); Imran Haque, Salt Lake City, UT (US); Marissa Saunders, South Salt Lake City, UT (US); Eric Fish, Salt Lake City, UT (US); Charles Baker, Millcreek, UT (US); Juan Sebastián Rodríguez Vera, Sandy, UT (US)

(73) Assignee: RECURSION PHARMACEUTICALS, INC., Salt Lake City, UT (US)

( * ) Notice: Subject to any disclaimer, the term of this patent is extended or adjusted under 35 U.S.C. 154(b) by 0 days.

(21) Appl. No.: 16/940,320

(22) Filed: Jul. 27, 2020

(65) Prior Publication Data
US 2022/0028061 A1 Jan. 27, 2022

(51) Int. Cl.
 *G06K 9/00* (2022.01)
 *G06T 7/00* (2017.01)
 *G06V 20/69* (2022.01)

(52) U.S. Cl.
 CPC .......... *G06T 7/0012* (2013.01); *G06V 20/698* (2022.01); *G06T 2200/24* (2013.01); *G06T 2207/20064* (2013.01); *G06T 2207/20081* (2013.01); *G06T 2207/30024* (2013.01); *G06T 2207/30242* (2013.01)

(58) Field of Classification Search
 None
 See application file for complete search history.

(56) References Cited

U.S. PATENT DOCUMENTS

2006/0039593 A1\* 2/2006 Sammak ............ G06K 9/00127
 382/133
2020/0202508 A1\* 6/2020 Amthor ................. G06T 7/0002

OTHER PUBLICATIONS

International Search Report Application No. PCT/US2021/042139 dated Aug. 10, 2021.

\* cited by examiner

*Primary Examiner* — Soo Jin Park
(74) *Attorney, Agent, or Firm* — Artegis Law Group, LLP

(57) ABSTRACT

In various embodiments, an experiment analysis application detects executional artifacts in experiments involving microwell plates. The experiment analysis application computes one or more sets of spatial features based on one or more heat maps associated with a microwell plate. The experiment analysis application then aggregates the set(s) of spatial features to generate a feature vector. The experiment analysis application inputs the feature vector into a trained classifier. In response, the trained classifier generates a label indicating that the microwell plate is associated with a first executional artifact.

20 Claims, 5 Drawing Sheets

TECHNIQUES FOR ANALYZING AND DETECTING EXECUTIONAL ARTIFACTS IN MICROWELL PLATES

BACKGROUND

Field of the Various Embodiments

The various embodiments relate generally to computer science and biochemical analysis, and, more specifically, to techniques for analyzing and detecting executional artifacts in microwell plates.

Description of the Related Art

High throughput screening is an automated process that allows a researcher to conduct tens of thousands or even hundreds of thousands of chemical, biological, genetic, and/or pharmacological tests per day. In a typical experiment, an integrated system automatically conducts tests using a set of microwell plates, where each plate includes a two-dimensional ("2D") grid of wells. The integrated system dispenses samples of different compounds for testing along with samples of a target into different wells. After an incubation period, during which any reactions between the compounds and the target are allowed to occur, various measurements are performed on the wells, and the results are stored as 2D arrays of measurement values in an experiment dataset.

One challenge associated with high throughput screening is that the experiment dataset can include certain errors known as "executional artifacts" that are attributable to the execution of the experiment itself. For example, if a dispensing nozzle were partially clogged and not able to properly dispense samples of a target to certain wells assigned to that nozzle, then the measurements performed on those particular wells would not capture actual or "full" reactions between the target and the compounds corresponding to the wells. Because the measurement values resulting from the measurements performed on the particular wells would be inaccurate and not reflective of actual or "full" reactions, those measurement values would be considered executional artifacts that reduce the overall quality of the experiment dataset. As a general matter, drawing valid conclusions about the effectiveness of various compounds with respect to a target is substantially more difficult using low-quality experiment datasets. Therefore, various attempts have been made to identify and mitigate executional artifacts in experiment datasets.

In one approach to identifying executional artifacts, human reviewers analyze "heat maps" (which are different arrays of measurement values or visual representations of different arrays of measurement values) in an attempt to detect anomalous patterns in the measurement values that are indicative of executional artifacts. Upon identifying an anomalous pattern, the reviewer typically annotates the associated plate to indicate the type and severity of the suspected executional artifact(s). Based on the annotated information, the measurement values associated with the plate can be excluded from the experiment dataset and/or re-reviewed. In addition, for some types of executional artifacts, attempts are made to determine and correct the root cause of the artifacts.

One drawback of the above approach is that manually analyzing the heat maps is time consuming and error prone. Oftentimes, the reviewers are unable to properly scrutinize all the heat maps associated with an experiment within the time available for the analysis process. To complete the analysis process within the available time, reviewers typically analyze only a limited number of the heat maps and/or perform a cursory analysis of the heat maps. As a result, executional anomalies reflected in the heat maps can be overlooked or misinterpreted Another drawback is that identifying executional artifacts is a subjective process. Consequently, even for heat maps that exhibit similar visual patterns, the number and/or types of executional artifacts identified can vary from reviewer to reviewer. Further, because manual review processes do not identify executional artifacts consistently, detecting trends in executional artifacts over time is quite difficult, if not impossible. As a result, opportunities to improve experimental processes and/or equipment in order to reduce executional artifacts can be lost.

As the foregoing illustrates, what is needed in the art are more effective techniques for analyzing and detecting executional artifacts in experiments involving microwell plates.

SUMMARY

One embodiment of the present invention sets for a method for detecting executional artifacts in experiments involving microwell plates. The method includes computing one or more sets of spatial features based on one or more heat maps associated with a first microwell plate; aggregating the one or more sets of spatial features to generate a first feature vector; and inputting the first feature vector into a trained classifier that, in response, generates a first label indicating that the first microwell plate is associated with a first executional artifact.

At least one technical advantage of the disclosed techniques relative to the prior art is that the disclosed techniques can be used to more accurately and consistently analyze and detect executional artifacts in experiments involving microwell plates. Among other things, with the disclosed techniques, each microwell plate is automatically classified based on spatial patterns detected in the heat maps generated for the microwell plate. Thus, the likelihood that executional anomalies reflected in the heat maps are overlooked or misinterpreted is reduced relative to prior art approaches. Furthermore, because the microwell plates are classified in a consistent, objective manner with respect to executional artifacts, trends in the executional artifacts over time can be effectively detected and used to improve experimental processes and/or equipment. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
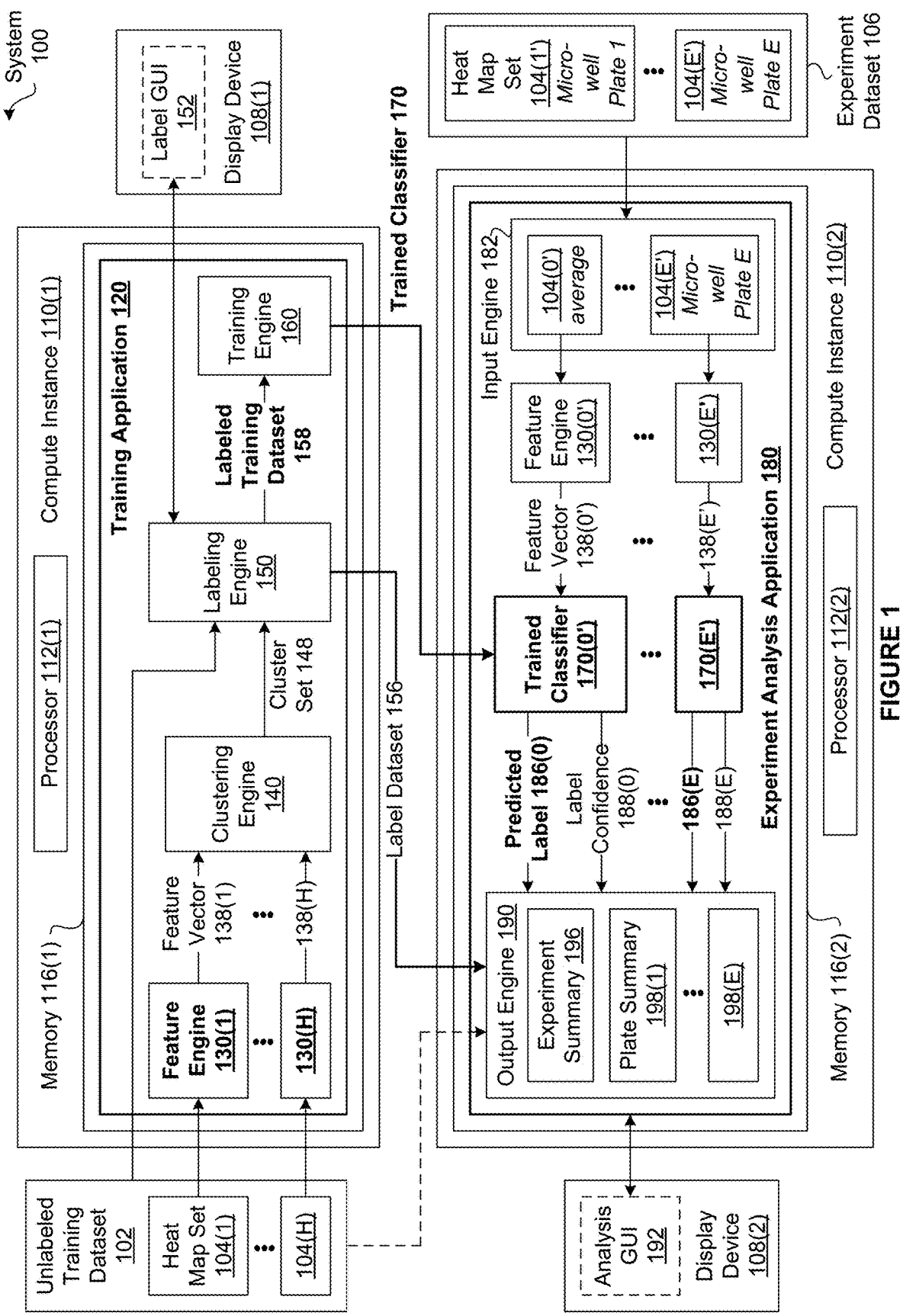
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

The disclosed techniques can be used to automatically detect executional anomalies in experiments conducted using microwell plates. In a training phase, a training application generates a trained classifier based on heat map sets, where each heat map set specifies one or more heat maps associated with a different microwell plate. For example, a heat map set for a given microwell plate could include a cell count heat map and any number of intensity heat maps, where each intensity heat map is associated with a different fluorescent dye. The cell count heat map could specify the cell count for each well in the microwell plate that is used during the experiment. A given intensity heat map could specify the average intensity for each used well when excited via the associated fluorescent dye.

Importantly, executional artifacts associated with a microwell plate often manifest as low frequency spatial patterns in one or more of the associated heat maps. For this reason, for each of the heat maps, the training application applies a wavelet transform to the heat map to determine a set of low frequency spatial patterns. For each of the microwell plates, the training application generates a feature vector based on the associated sets of low frequency spatial patterns.

The training application executes a clustering algorithm to partition the feature vectors into clusters. The feature vectors in each cluster are more similar to each other than to the feature vectors in the other clusters. The training application generates a different label for each of the clusters that can be overridden via a graphical user interface ("GUI"). For example, the training application could automatically generate a label "L1" for a cluster that is associated with microwell plates in which the fourth rows from the bottom have low cell counts and low intensity values relative to the other rows in the microwell plates. The label "L1" could be updated to the label "row failure" via the GUI. Based on the feature vectors and the associated labels, the training application trains a classifier to map a feature vector to a predicted label and an associated label confidence.

Subsequently, during an inference phase, an experiment analysis application uses the trained classifier to detect and assess executional anomalies associated with an experiment that is conducted via a set of microwell plates based on heat map sets for the set of microwell plates. The experiment analysis application generates an average heat map set that represents the overall experiment based on the heat map sets for the set of microwell plates. The experiment application inputs each of the heat map sets (including the average heat map set) associated with the experiment into the trained classifier to generate a predicted label and a label confidence.

For each microwell plate included in the set of microwell plates, the experiment analysis application computes an anomaly score that indicates how outlying the microwell plate is with respect to the cluster associated with the predicted label. For the overall experiment, the experiment analysis application computes a matching plate fraction that specifies the percentage of the microwell plates associated with the experiment having predicted labels that are equal to the predicted label for the overall experiment. The experiment analysis application then provides to any number of software applications and/or displays via a GUI any number of the predicted labels, the label confidences, the anomaly scores, and the matching plate fraction in any combination. In this fashion, the experiment analysis application classifies the overall experiment and each of the associated microwell plates in a consistent, objective manner with respect to executional artifacts.

System Overview

FIG. 1 is a conceptual illustration of a system configured to implement one or more aspects of the various embodiments. For explanatory purposes, multiple instances of like objects are denoted with reference numbers identifying the object and parenthetical alphanumeric character(s) identifying the instance where needed. As shown, the system 100 includes, without limitation, compute instances 110(1) and 110(2), display devices 108(1) and 108(2), an unlabeled training dataset 102, and an experiment dataset 106.

In some embodiments, the system 100 can include, without limitation, any number of compute instances 110, any number of display devices 108, any number of unlabeled training datasets 102, and any number of experiment datasets 106 in any combination. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instances 110(1) and 110(2) are also referred to herein individually as "the compute instance 110" and collectively as "the compute instances 110." The processors 112(1) and 112(2) are also referred to herein individually as "the processor 112" and collectively as "the processors 112." The memories 116(1) and 116(2) are also referred to herein individually as "the memory 116" and collectively as "the memories 116." Each of the compute instances 110 may be implemented in a cloud computing environment, implemented as part of any other distributed computing environment, or implemented in a stand-alone fashion.

The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. In some embodiments, each of any number of compute instances 110 may include any number of processors 112 and any number of memories 116 in any combination.

Each of the compute instances 110 can be implemented in a cloud computing environment, implemented as part of any other distributed computing environment, or implemented in a stand-alone fashion. In particular, any number of the compute instances 110 (including one) can provide a multiprocessing environment in any technically feasible fashion.

The memory 116 can be one or more of a readily available memory, such as random-access memory, read only memory, floppy disk, hard disk, or any other form of digital storage, local or remote. In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In some embodiments, the compute instance 110 can be associated with any number (including zero) and/or types of input devices, output devices, and/or input/output devices in any combination. An input device is any device that is capable of receiving input from users. Some examples of input devices include, without limitation, keyboards, mice, trackpads, microphones, video cameras, etc. An output device is any device that is capable of providing output to users. Some examples of output devices include, without limitation, the display devices 108, headphones, speakers, etc. An input/output device is any device that is capable of both receiving input from users and providing output to users, such as a touchscreen.

As shown, in some embodiments, the compute instance 110(1) is associated with the display device 108(1), and the compute instance 110(2) is associated with the display device 108(2). The display devices 108(1) and 108(2) are also referred to herein individually as "the display device 108" and collectively as "the display devices 108." The display device 108 can be any device that is capable of displaying an image and/or any other type of visual content. Some examples of display devices 108 include, without limitation, liquid crystal displays, light-emitting diode displays, projection displays, plasma display panels, etc. In some embodiments, the display device 108 is a touchscreen that is capable of displaying visual content and receiving input (e.g., from a user).

In some embodiments, the compute instance 110 can be integrated with any number and/or types of other devices (e.g., other compute instances 110, input devices, output devices, input/output devices, etc.) into a user device. Some examples of user devices include, without limitation, desktop computers, laptops, smartphones, smart televisions, game consoles, tablets, etc.

In general, each of the compute instances 110 is configured to implement one or more applications. For explanatory purposes only, each application is described as residing in the memory 116 of a single compute instance 110 and executing on a processor 112 of the single compute instance 110. However, in some embodiments, the functionality of each application may be distributed across any number of other applications that reside in the memories 116 of any number of compute instances 110 and execute on the processors 112 of any number of compute instances 110 in any combination. Further, the functionality of any number of applications can be consolidated into a single application.

In some embodiments, any number of applications and/or portions of applications are stored in one or more non-transitory computer readable media. The term "non-transitory," as used herein, is a limitation of the medium itself (i.e., tangible, not a signal) as opposed to a limitation on data storage persistency (e.g., RAM vs. ROM). Non-transitory computer readable media are also referred to herein "computer readable media." For instance, in some embodiments, the memory 116(1) is a computer readable medium, and any number of applications and/or portions of applications are stored in the memory 116(1). In the same or other embodiments, the memory 116(2) is a computer readable medium, and any number of applications and/or portions of applications are stored in the memory 116(2).

In some embodiments, any number of applications and/or portions of applications are stored in one or more computer readable media prior to being stored in the memory 116(1) and/or the memory 116(2). For instance, in some embodiments, any number of applications and/or portions of applications are stored on a machine (e.g., a server machine), and any number of the applications and/or the portions of the applications are downloaded from the machine to the memory 116(1) and/or the memory 116(2). In the same or other embodiments, any number of applications and/or portions of applications are stored in some form of portable computer readable medium, and any number of the applications and/or the portions of the applications are downloaded from the portable computer readable medium to the memory 116(1) and/or the memory 116(2). Some examples of portable computer readable media includes, without limitation, digital video discs, memory discs, memory sticks, etc.

In some embodiments, aspects of the present disclosure can take the form a computer program product embodied in one or more computer readable media having computer readable program codec embodied thereon. Any combination of one or more computer readable media may be utilized. Each computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, or a Flash memory), an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

The compute instances 110 are configured to detect and facilitate root cause analyses of executional artifacts in experiments involving microwell plates that are performed using high throughput screening. As described previously herein, in a typical experiment, an integrated system automatically conducts tests using a set of microwell plates. As referred to herein, a microwell plate can be any plate that includes, without limitation, a 2D grid of wells that are each capable of holding a limited volume. A microwell plate is also commonly referred to as a microplate, a multiwell plate, and a multiwell culture plate.

Each experiment includes, without limitation, any number of chemical, biological, genetic, and/or pharmacological tests, where each test is conducted within a different well. For a typical experiment, the assignments of tests to wells are randomized within each microwell plate. After the tests are complete, various measurements are performed on the wells, and the results are stored as 2D arrays of measurement values in an experiment dataset. Because the assignment of tests is randomized, the distribution of measurement values within each 2D array is ostensible random.

One challenge associated with high throughput screening is that the experiment dataset can include certain errors known as "executional artifacts" that are attributable to the experiment itself. Some root causes of executional artifacts include without limitation, equipment problems, calibration issues, and environmental variations, to name a few. As persons skilled in the art will recognize, these types of circumstances often manifest as low frequency spatial patterns in one or more of the 2D arrays of measurement values. As a general matter, drawing valid conclusions regarding an experiment is substantially more difficult when the quality of the associated experiment dataset is significantly degraded by executional artifacts. Therefore, various attempts have been made to identify and mitigate executional artifacts in experiment datasets.

In a review-based approach to identifying executional artifacts, human reviewers visually analyze heat maps in an attempt to detect anomalous patterns in the measurement values that are indicative of executional artifacts. One drawback of such a review-based approach is that manually analyzing the heat maps is time consuming and error prone. As a result, executional anomalies reflected in the heat maps can be overlooked or misinterpreted. Another drawback is that identifying executional artifacts is a subjective process. Consequently, even for heat maps that exhibit similar visual patterns, the number and/or types of executional artifacts identified can vary from reviewer to reviewer.

Automatically Identifying Executional Artifacts Based on Spatial Information

To address the above problems, the compute instance 110(1) include, without limitation, a training application 120. As described below, the training application 120 generates a trained classifier 170 that automatically maps a feature vector 138 associated with a microwell plate to a predicted label 186 that indicates a type and/or severity of any executional artifacts associated with the microwell plate. In some embodiments, the trained classifier 170 also generates a label confidence 188 that correlates to a likelihood that the predicted label 186 is accurate.

For explanatory purposes only, "the feature vector 138" refers to any instance of the feature vector 138, irrespective of whether the specific instance is depicted in any of the figures. The "predicted label 186" refers to any instance of the predicted label 186, irrespective of whether the specific instance is depicted in any of the figures. The "label confidence 188" refers to any instance of the label confidence 188, irrespective of whether the specific instance is depicted in any of the figures The training application 120 resides in the memory 116(1) of the compute instance 110(1) and executes on the processor 112(1) of the compute instance 110(1). In some embodiments, the training application 120 generates the trained classifier 170 based on the unlabeled training dataset 102. As shown, the unlabeled training dataset 102 includes, without limitation, heat maps sets 104(1)-104(H), where H can be any positive integer. Each of the heat map sets 104(1)-104(H) is associated with a different microwell plate, and the H microwell plates can be associated with any number of previously conducted experiments. For explanatory purposes only, "the heat map set 104" refers to any instance of the heat map set 104 (including each of the heat map sets 104(1)-104(H)), irrespective of whether the specific instance is depicted in any of the figures.

The heat map set 104 includes, without limitation, F heat maps (not shown in FIG. 1), where F is an integer greater than or equal to one. Each heat map is a 2D array of measurement values or a visual representation of a 2D array of measurement values, where each measurement value corresponds to a different well included in the associated microwell plate. As referred to herein, a "measurement value" can be derived based on any number and/or type of measurements performed on the associated microwell plate. In general, the spatial positions of the measurement values included in a heat map correlate to the spatial positions of the corresponding wells within the 2D grid of wells included in the associated microwell plate. In some embodiments, each heat map can specify any number and/or types of values in any technically feasible fashion.

In some embodiments, each heat map is replaced with a measurement value array, and the heat map set 104 is replaced with a set of measurement value arrays. Each measurement value array includes, without limitation, any number of measurement values. For each measurement value included in a given measurement value array, the measurement value array indicates the corresponding well of the associated microwell plate in any technically feasible fashion. In some other embodiments, the heat map set 104 is replaced with any number of measurement values and, for each of the measurement values, the type of the measurement value and the corresponding well of the associated microwell plate is indicated in any technically feasible fashion. The techniques described herein are modified accordingly.

One well-known type of executional artifact is an "edge artifact" that is associated with wells that are located on the perimeter of microwell plates. The results of any tests conducted within wells located on the perimeter of microwell plates are usually corrupted by physical and environmental variances (e.g., evaporation). For this reason, in some embodiments, tests are not conducted within the wells that are on the outer perimeters of the microwell plates. Accordingly, the size of the 2D grid of wells included in a microwell plate is larger than the size of the associated heat maps. For instance, in some embodiments, each microwell plate includes, without limitation, a 32-by-48 grid of wells and each of the heat maps is a 30-by-46 array of measurement values.

Each heat map included in a heat map set 104 corresponds to a different type of measurement that is performed on the associated microwell plate. For instance, in some embodiments, each heat map set 104 includes, without limitation, a heat map corresponding to a cell count, and six heat maps corresponding to six different imaging channels. Each heat map can be generated in any technically feasible fashion. For instance, in some embodiments, a heat map corresponding to an imaging channel specifies the average intensity of each well when excited via a fluorescent dye associated with the imaging channel.

The training application 120 acquires the unlabeled training dataset 102 in any technically feasible fashion. For example, and without limitation, the training application 120 can read the unlabeled training dataset 102 from the memory 116, receive the unlabeled training dataset 102 as an input, etc. In some embodiments, the training application 120 performs, without limitation, any number (including zero) and/or types of pre-processing operations on the unlabeled training dataset 102. Some examples of types of pre-processing operations include, without limitation, interpolating undefined measurement values, clipping extreme measurement values, and normalizing within and/or across the heat map sets 104(1)-104(H), As shown, the training application 120 includes, without limitation, feature engines 130(1)-130(H) (where H is the total number of the heat map sets 104 included in the unlabeled training dataset 102), a clustering engine 140, a labeling engine 150, and a training engine 160. The feature engines 130(1)-130(H) are different instances of a single feature engine 130 (not explicitly shown). For explanatory purposes only, "the feature engine 130" as used herein refers to any instance of the feature engine 130, irrespective of whether the specific instance is depicted in any of the figures.

As shown, the training application 120 inputs the heat map sets 104(1)-104(H) into the feature engines 130(1)-130(H), respectively. In response the feature engines 130(1)-130(H) output the feature vectors 138(1)-138(H), respectively. In some embodiments, the training application 120 includes less than H instances of the feature engine 130, and the training application 120 inputs the heat map sets 104(1)-104(H) into any number of instances of the feature engine 130 sequentially, concurrently, or in any combination thereof. For instance, in some embodiments, the training application 120 sequentially inputs the heat map sets 104(1)-104(H) into a single instance of the feature engine 130. In response, the single instance of the feature engine 130 sequentially outputs the feature vectors 138(1)-138(H).

The feature vectors 138(1)-138(H) specify, without limitation, any amount and/or types of information related to spatial patterns associated with the heat map sets 104(1)-104(H), respectively. Consequently, the feature vectors 138(1)-138(H) each represent, without limitation, spatial patterns associated with a different microwell plate. In some embodiments, each of the feature vectors 138(1)-138(H), includes, without limitation, any number of spatial features and/or any number of other types of features in any combination.

The feature engine 130 can perform any number and/or types of operations on the heat map set 104 to generate the feature vector 138 associated with the heat map set 104. In some embodiments, and as described in greater detail below in conjunction with FIG. 2, the feature engine 130 applies a wavelet transform to each of the heat maps included in the heat map set 104 to generate multilevel wavelet decompositions. The feature engine 130 then extracts features from the two lowest levels of the multilevel wavelet decompositions and concatenates the extracted features to generate the feature vector 138.

As persons skilled in the art will recognize, the wavelet transform extracts local spatial information across specific portions of the heat maps, and the two lowest levels of the multilevel wavelet decompositions represent low frequency spatial patterns. Furthermore, as noted previously herein, variations in the circumstances associated with an experiment often manifest as low frequency spatial patterns in one or more of heat maps. Consequently, the feature vector 138 that is generated based on a wavelet transform correlates to the types and severity of executional artifacts associated with the corresponding microwell plate.

As shown, the clustering engine 140 generates a cluster set 148 based on the feature vectors 138(1)-138(H). The cluster set 148 includes, without limitation, any number and/or types of clusters (not shown in FIG. 1). The feature vectors 138(1)-138(H) are distributed between the clusters based on similarities between the feature vectors 138(1)-133(H). Each cluster specifies, without limitation, one or more of the feature vectors 138 that are more similar to each other than to the feature vectors 138 included in the other clusters. Each cluster is associated with the microwell plates from which the feature vectors 138 included in the cluster were derived. The clustering engine 140 can execute any number and/or types of clustering algorithms based on the feature vectors 138(1)-138(H) in any technically feasible fashion to generate the cluster set 148.

In some embodiments, the clustering engine 140 executes an agglomerative clustering algorithm based on the feature vectors 138(1)-138(H) and an empirically determined total number of clusters. In some embodiments, the clustering engine 140 executes an agglomerative clustering algorithm based on the feature vectors 138(1)-138(H) and a distance threshold. In some other embodiments, the clustering engine 140 executes a centroid-based clustering algorithm (e.g., a k-means clustering algorithm), a density-based clustering algorithm, or a distribution-based clustering algorithm.

The labeling engine 150 generates a label dataset 156 and a labeled training dataset 158 based on the cluster set 148 and the unlabeled training dataset 102. As described in greater detail in conjunction with FIG. 3, in some embodiments, for each of the clusters included in the cluster set 148, the label dataset 156 includes, without limitation, a labeled cluster. Each labeled cluster includes, without limitation, the cluster, a cluster label, and, optionally, a mean heat map set. The cluster label specifies a label that uniquely identifies the cluster. The labeling engine 150 can determine the cluster labels in any technically feasible fashion. For instance, in some embodiments, the labeling engine 150 sets a first cluster label equal to a default integer (e.g., 1) and then increments the integer for each subsequent cluster label.

Figure 3:
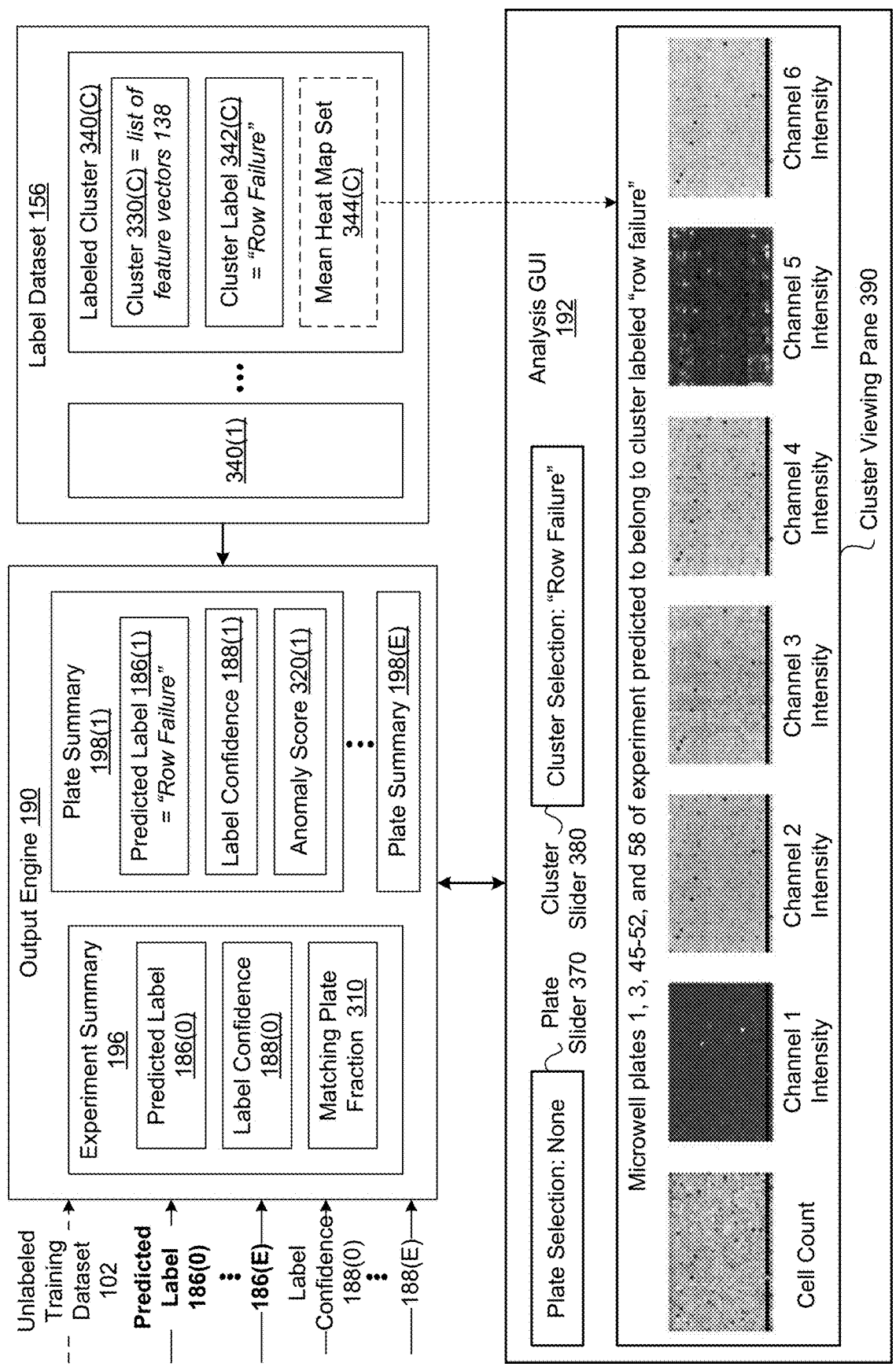
FIG. 3 is a more detailed illustration of the output engine of FIG. 1, according to various embodiments.

As described in greater detail in conjunction with FIG. 3, the mean heat map set for a cluster is an overall representation of the cluster and includes, without limitation, F mean heat maps, where F is the number of heat maps included in each of the heat map sets 104(1)-104(H). The labeling engine 150 can compute the mean heat map set for a cluster in any technically feasible fashion. For instance, in some embodiments, the labeling engine 150 sets each of the mean heat maps for a cluster equal to the trimmed mean of the corresponding heat maps included in the heat map sets 104 assigned to the cluster. In some embodiments, the mean heat maps are replaced with mean measurement value arrays.

In some embodiments, the labeling engine 150 generates the labeled training dataset 158 based on the label dataset 156. The labeled training dataset 158 includes, without limitation, the feature vectors 138(1)-138(H) and, for each of the feature vectors 138(1)-138(H), a label (not shown). The label for a given feature vector 138 is the cluster label for the cluster that includes the feature vector 138.

In some embodiments, and as depicted via a dashed arrow, the labeling engine 150 displays a label GUI 152 via the display device 108(1). The labeling engine 150 can generate any type of indication to display any amount and/or types of data via the label GUI 152 in any technically feasible fashion. In some embodiments, the labeling engine 150 can display, via the label GUI 152, any portions (including none or all) of the label dataset 156, the labeled training dataset 158 and/or the unlabeled training dataset 102 in any combination and at any given point in time. For instance, in some embodiments the labeling engine 150 displays a visual representation of the cluster set 148, any number of the heat map sets 104(1)-104(H), and/or the mean heat map set for any number of the clusters prior to generating the labeled training dataset 158.

The labeling engine 150 can generate any type of visual representation of the cluster set 148 in any technically feasible fashion. In some embodiments, the labeling engine 150 executes a T-distributed Stochastic Neighbor Embedding ("t-SNE") algorithm based on the feature vectors 138(1)-138(H) to generate a transformed output. The labeling engine 150 then displays a scatterplot of the transformed output, where the points representing the feature vectors 138(1)-138(H) are colored based on the associated cluster labels.

In some embodiments, the labeling engine 150 modifies the label dataset 156 based on input received via the label GUI 152. Some examples of modifications that the labeling engine 150 can make to the label dataset 156 include, without limitation, merging clusters that represent the same type of executional artifacts, redistributing the heat maps sets 104 (and the associated microwell plates) between the clusters, modifying the cluster labels, etc. Notably, the cluster labels can be updated to identify types of spatial patterns, types of executional artifacts, severity of executional artifacts, and so forth. After the clustering engine 140 modifies the label dataset 156, the labeling engine 150 modifies and/or re-generates the labeled training dataset 158 to reflect the modifications to the label dataset 156.

In the same or other embodiments, the labeling engine 150 can cause the clustering engine 140 to iteratively modify the cluster set 148 in any technically feasible fashion and based on any number and/or types of criteria. For instance, in some embodiments, the labeling engine 150 can cause the clustering engine 140 to modify a parameter associated with a clustering algorithm (e.g., a total number of clusters, a distance threshold, etc.) based on user feedback. After the clustering engine 140 re-generates the cluster set 148, the labeling engine 150 modifies and/or re-generates the label dataset 156 and/or the labeled training dataset 158.

In some embodiments, the label dataset 156 can include, without limitation, any amount of information associated with the unlabeled training dataset 102, the cluster set 148, the labeled training dataset 158 and/or executional artifacts identified via the trained classifier 170 instead of or in addition to the clusters, the cluster labels, and the mean heat map set. In the same or other embodiments, the labeling engine 150 displays, via the label GUI 152, any amount of information that is derived from the unlabeled training dataset 102, the cluster set 148, and/or the labeled training dataset 158 in any technically feasible fashion.

As shown, the training engine 160 generates the trained classifier 170 based on the labeled training dataset 158. More precisely, the training engine 160 trains a classifier to map different feature vectors 138 to different predicted labels 186, where each of the predicted labels 186 is equal to one of the cluster labels included in the label dataset 156. In some embodiments, the training engine 160 also trains the classifier to compute the label confidence 188 for each of the predicted labels 186, where the label confidence 188 correlates to a likelihood that the predicted label 186 is accurate.

As persons skilled in the art will recognize, the process of training a classifier based on the results of a clustering algorithm is referred to as "inductive clustering" and any amount and type of associated operations are referred to herein as "inductive clustering operations." The training engine 160 can execute any number and/or types of supervised machine learning algorithms to generate any type of trained classifier 170 based on the labeled training dataset 158. In some embodiments, the trained classifier 170 is a trained random forest, a trained neural network, a trained decision tree, a trained support vector machine, or any other technical feasible trained machine learning model.

In some embodiments, the training application 120 can execute any number and/or types of unsupervised machine learning operations, supervised machine learning operations, semi-supervised machine learning operations, and/or reinforcement learning operations in any combination to generate any number and/or types of trained models that, together, map an inputted feature vector 138 to the predicted label 186. For instance, in some embodiments, the unlabeled training dataset 102 is replaced with a manually labeled training dataset, and the clustering engine 140 and the labeling engine 150 are omitted from the system 100.

Advantageously, because each of the cluster labels included in the label dataset 156 is associated with any number (including zero) and/or types of executional anomalies, each of the predicted labels 186 classifies the associated feature vector 138 with respect to executional anomalies. Accordingly, the trained classifier 170 automatically classifies a microwell plate associated with an inputted feature vector 138 with respect to any number and/or types of executional anomalies associated with the cluster set 148.

In some embodiments, the feature vector 138 associated with the heat map set 104 can be replaced with a set of any number and/or types of features that each represent any amount and type of spatial information associated with the heat map set 104 that is relevant to identifying executional artifacts. The training engine 160 generates the trained classifier 170 based on the labeled training dataset 158 that includes, without limitation, the sets of features instead of the feature vectors 138.

In some embodiments, the training application 120 transmits the trained classifier 170, the label dataset 156, and, optionally, the unlabeled training dataset 102 to an experiment analysis application 180. In some embodiments, the training application 120 transmits any of the trained classifier 170, the label dataset 156, and the unlabeled training dataset 102 in any combination to any number and/or types of software applications instead of or in addition to the experiment analysis application 180. In the same or other embodiments, the training application 120 stores any of the trained classifier 170, the label dataset 156, and the unlabeled training dataset 102 in any combination in any memory that is accessible by the experiment analysis application 180 and/or any number of other software applications.

In some embodiments, the training application 120 generates a reference guide based on the label dataset 156 and, optionally, provides the reference guide to the experiment analysis application 180 and/or any number and/or types of other software applications. For instance, in some embodiments, the training application 120 generates the reference guide based on the mean heat map sets and the cluster labels included in the label dataset 156.

The experiment analysis application 180 uses the trained classifier 170 to detect executional artifacts included in the experiment dataset 106 and to facilitate root cause analysis of the detected executional artifacts. In some embodiments, the experiment analysis application 180 also uses the label dataset 156 and, optionally, the unlabeled training dataset 102 to facilitate root cause analyses of the detected executional artifacts. For explanatory purposes only, for each like object that is included in both the training application 120 and the experiment analysis application 180, parenthetical alphanumeric character(s) identifying the instances that are included in the experiment analysis application 180 are annotated with a prime mark. Furthermore, the functionality of each object included in the experiment analysis application 180 that is also included in the training application 120 is the same as the functionality described for the object in the context of the training application 120.

The experiment dataset 106 represents the results of a single experiment that is conducted via a set of microwell plates. The experiment dataset 106 includes, without limitation, the heat map sets 104(1')-104(E'), where E can be any positive integer. Each of the heat map sets 104(1')-104(E') represents a different microwell plate that is associated with the experiment. As shown in italics, the heat map sets 104(1')-104(E') are associated with the microwell plates denoted 1-E, respectively. As noted previously herein, the heat map set 104 includes, without limitation, F heat maps (not shown in FIG. 1), where F is an integer greater than or equal to one.

For explanatory purposes only, the experiment analysis application 180 is described herein in the context of a single experiment dataset 106. In some embodiments, any number (including one) of instances of the experiment analysis application 180 detect executional artifacts included in any number of experiment datasets 106 sequentially, concurrently, or in any combination thereof The experiment analysis application 180 resides in the memory 116(2) of the compute instance 110(2) and executes on the processor 112(2) of the compute instance 110(2). In some embodiments, any number of instances of the experiment analysis application 180 can reside in the memories 116 of any number of compute instances 110 and execute on the processors of the compute instances 110. As shown, the experiment analysis application 180 includes, without limitation, an input engine 182, the feature engines 130(0')-130(E'), the trained classifiers 170(0')-170(E'), and an output engine 190.

The input engine 182 acquires the experiment dataset 106 in any technically feasible fashion. In some embodiments, the input engine 182 performs, without limitation, any number (including zero) and/or types of pre-processing operations on the experiment dataset 106. Some examples of types of pre-processing operations that the input engine 182 can perform include, without limitation, interpolating undefined measurement values, clipping extreme measurement values, and normalizing within and/or across the heat map sets 104(1')-104(E').

After acquiring and, optionally, pre-processing the experiment dataset 106, the input engine 182 generates the heat map set 104(0') based on the heat map sets 104(1')-104(E'). The heat map set 104(0') represents a non-existent "average" microwell plate associated with the experiment dataset 106. The input engine 182 can generate the heat map set 104(0') in any technically feasible fashion. For instance, in some embodiments, the input engine 182 sets each of the F heat maps included in the heat map set 104(Q) equal to the mean of the corresponding heat maps included in the heat map sets 104(1')-104(E'). In some other embodiments, the input engine 182 sets each of the F heat maps included in the heat map set 104(0') equal to the trimmed mean of the corresponding heat maps included in the heat map sets 104(1')-104(E'). In some embodiments, the input engine 182 does not compute the heat map set 104(0') and the techniques described herein are modified accordingly.

As shown, the experiment analysis application 180 inputs the heat map sets 104(0')-104(E') into the feature engines 130(0')-130(E'), respectively. In response the feature engines 130(0')-130(E') output the feature vectors 138(0')-138(E'), respectively. In some embodiments, the experiment analysis application 180 includes less than E instances of the feature engine 130, and the experiment analysis application 180 inputs the heat map sets 104(0')-104(E') into any number of instances of the feature engine 130 sequentially, concurrently, or in any combination thereof.

The experiment analysis application 180 inputs the feature vectors 138(0')-138(E') into the trained classifiers 170(0')-170(E'), respectively. In response the trained classifiers 170(0')-170(E') output the predicted labels 186(0)-186(E), respectively. In some embodiments, the trained classifiers 170(0')-170(E') also output the label confidences 188(0)-188(E), respectively.

In some embodiments, the experiment analysis application 180 includes less than E instances of the trained classifier 170, and the experiment analysis application 180 inputs the heat map sets 104(0')-104(E') into any number of instances of the feature engine 130 sequentially, concurrently, or in any combination thereof. In the same or other embodiments, the experiment analysis application 180 can configure the trained classifier 170 to generate any number of predicted labels 186 and, optionally, any number of label confidences 188 based on any number of feature vectors 138 in any technically feasible fashion.

In some embodiments, the training application 120 generates any type of trained machine learning model instead of the trained classifier 170. The training application 120 can generate the trained machine learning model based on the labeled training dataset 158 in any technically feasible fashion. Subsequently, the experiment analysis application 180 generates the predicted labels 186(0)-186(E) based on the trained machine learning model in any technically feasible fashion. For instance, in some embodiments, the experiment analysis application 180 inputs the feature vectors 138(0')-138(E') into any number of instances of the trained machine learning model. In response, the instance(s) of the trained machine learning model output the predicted labels 186(0)-186(E) and, optionally, the label confidences 188(0)-188(E).

Each of the predicted labels 186(0)-188(E) is one of the cluster labels and may differ from any number of the other predicted labels 186. The predicted label 186(0) is an estimated classification of the overall experiment associated with the experiment dataset 106, and the label confidence 188(0) correlates to a likelihood that the predicted label 186(0) applies to the overall experiment. The predicted labels 186(1)-186(E) are estimated classifications of the microwell plates 1-E, respectively. The label confidences 188(1)-188(E) correlate to likelihoods that the predicted labels 186(1)-186(E) apply to the microwell plates 1-E, respectively.

As described in greater detail in conjunction with FIG. 3, the output engine 190 generates an experiment summary 196 and plate summaries 198(1)-198(E) based on the predicted labels 186(0)-186(E), the label confidences 188(0)-188(E), the label dataset 156, and (optionally) the unlabeled training dataset 102. The experiment summary 196 provides any amount of information regarding the overall experiment that is relevant to executional artifacts or the lack thereof. The plate summaries 198(1)-198(E) provide any amount of information regarding the microwell plates 1-E, respectively, that is relevant to executional artifacts or the lack thereof.

In some embodiments, the experiment summary 196 includes, without limitation, the predicted label 186(0), the label confidence 188(0), and a matching plate fraction (not shown in FIG. 1). The output engine 190 sets the matching plate fraction equal to a percentage of the predicted labels 186(1)-186(E) that are equal to the predicted label 186(0). In some embodiments, the matching plate fraction is replaced with a matching plate count that indicates how many of the microwell plates associated with the experiment dataset 106 are also associated with the predicted label 186(0).

In the same or other embodiments, the plate summary 198(x), for the integer x between 1 and E, includes, without limitation, the predicted label 186(x), the label confidence 188(x), and an anomaly score for the microwell plate x. The anomaly score for the microwell plate x indicates how outlying the microwell plate x is with respect to the cluster associated with the predicted label 186(x). The output engine 190 can compute the anomaly score in any technically feasible fashion.

For instance, in some embodiments, the output engine 190 uses the feature engine 130 to compute the feature vector 138 associated with the mean heat map set for the cluster associated with the predicted label 186(x). The output engine 190 then computes the dissimilarity between the feature vector 138(x') and the feature vector 138 associated with the mean heat map set. In some embodiments, the anomaly score is replaced with a similarity score for the microwell plate x that indicates how similar the microwell plate x is with respect to the cluster associated with the predicted label 186(x).

In some embodiments, and as depicted via a dashed arrow, the output engine 190 displays an analysis GUI 192 via the display device 108(2). The output engine 190 can generate any type of indication to display any amount and/or types of data via the analysis GUI 192 in any technically feasible fashion. In some embodiments, the output engine 190 can display, via the analysis GUI 192, any portions (including none or all) of the experiment summary 196, the plate summaries 198(1)-198(E), the label dataset 156, and/or the unlabeled training dataset 102 in any combination and at any given point in time. For example, the output engine 190 could indicate, via the analysis GUI 192, that the predicted labels 186(1)-186(E') are assigned to the heat map sets 104(1')-104(E'), respectively. In some embodiments the output engine 190 displays a visual representation of the cluster set 148, any number of the heat map sets 104(1)-104(H), and/or the mean heat map set for any number of the clusters in any technically feasible fashion.

In some embodiments, the output engine 190 causes the training application 120 to iteratively modify and/or regenerate the cluster set 148, the label dataset 156, the labeled training dataset 158, and/or the trained classifier 170 based on input received via the analysis GUI 192. Some examples of modifications that the output engine 190 can cause the training application 120 to implement based on input received via the analysis GUI 192 include, without limitation, merging clusters, redistributing the heat maps sets (and the associated microwell plates) between clusters, modifying the cluster labels, etc.

Advantageously, because the trained classifier 170 automatically and objectively classifies the heat map sets 104 (1')-104(E'), the trained classifier 170 can be used to efficiently and accurately identify executional artifacts in the experiment associated with the experiment dataset 106. Furthermore, the anomaly scores provide insight into whether each microwell plate belongs to a cluster that has no significant executional artifacts, belongs to a cluster of microwell plates that have known executional artifacts, or is associated with a new type of executional artifact or other anomaly. Accordingly, the anomaly scores facilitate root cause analyses.

In additional, because the experiment summary 196 and the plate summaries 198(1)-198(E) provide objective information regarding executional anomalies, the experiment summary 196 and the plate summaries 198(1)-198(E) can be used to efficiently detect trends associated with executional anomalies over time and across experiments. Based on the detected trends, users can make modifications to the experimental process and/or the equipment to reduce the number of executional anomalies included in future experiment datasets 106.

Note that the techniques described herein are illustrative rather than restrictive and may be altered without departing from the broader spirit and scope of the invention. Many modifications and variations on the functionality provided by the training application 120, the feature engine 130, the clustering engine 140, the labeling engine 150, the trained classifier 170, the experiment analysis application 180, the input engine 182, and the output engine 190 will be apparent to those of ordinary skill in the art without departing from the scope and spirit of the described embodiments It will be appreciated that the system 100 shown herein is illustrative and that variations and modifications are possible. For instance, in some embodiments, the functionality provided by the labeling engine 150 as described herein is integrated into the clustering engine 140. In the same or other embodiments, the functionality provided by the training application 120 and the functionality provided by the experiment analysis application 180 are integrated into a single application. Further, the connection topology between the various components in FIG. 1 may be modified as desired.

Figure 2:
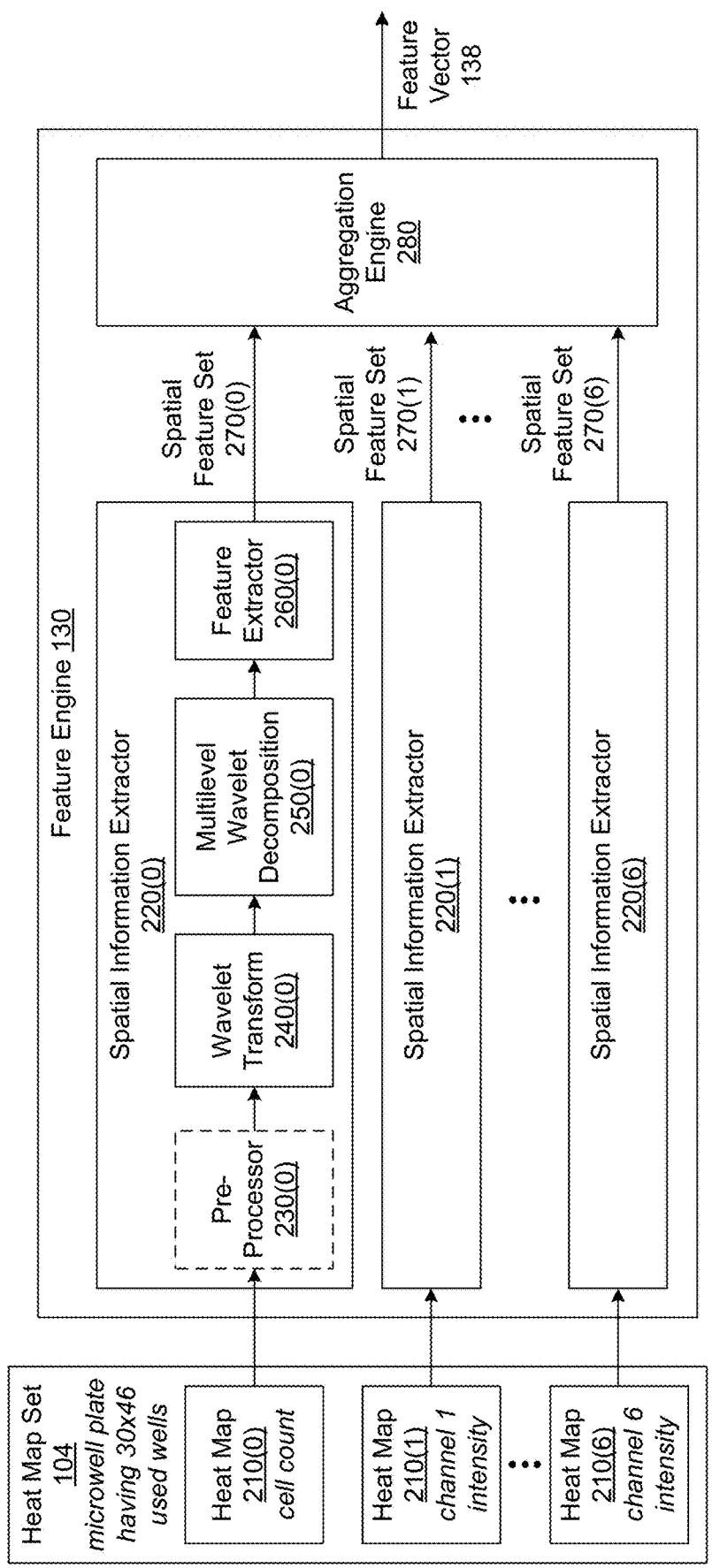
FIG. 2 is a more detailed illustration of the feature engine of FIG. 1, according to various embodiments.

FIG. 2 is a more detailed illustration of the feature engine 130 of FIG. 1, according to various embodiments. As shown, the feature engine 130 generates the feature vector 138 based on the heat map set 104. For explanatory purposes only, the heat map set 104 reflects measurement values associated with seven different types of measurements for a microwell plate having 30×46 used wells. Consequently, the heat map set 104 includes, without limitation, a total of 9660 measurement values (not shown).

As shown, the heat map set 104 includes, without limitation, heat maps 210(0)-210(6). For explanatory purposes only, and as indicated in italics, the heat map 210(0) is a 2D array that includes, without limitation, 1380 measurement values specifying the cell counts of the 1380 used wells. Each of the heat maps 210(1)-210(6) is a 2D array that includes, without limitation, 1380 measurement values specifying the intensities of the 1380 used wells for a different imaging channel. In other embodiments, the heat map set 104 can include, without limitation, any number of heat maps 210 and each of the heat maps 210 can correspond to any type of measurement.

The feature engine 130 includes, without limitation, spatial information extractors 220(0)-220(6) and an aggregation engine 280. The spatial information extractors 220(0)-220 (6) generate spatial feature sets 270(0)-270(6), respectively, based on the heat maps 210(0)-210(6), respectively. In some embodiments, the feature engine 130 can include any number of instances of the spatial information extractor 220 and the instances of the spatial information extractor 220 can generate the spatial feature sets 270(0)-270(6) based on the heat maps 210(0)-210(6), respectively, concurrently, sequentially, or in any combination thereof. In the same or other embodiments, each of the spatial features sets 270(0)-270(H), includes, without limitation, any number of spatial features and/or any number of other types of features in any combination. Each of the spatial feature sets 270(0)-270(6) is also referred to herein as a "set of spatial features."

As shown, the spatial information extractor 220(0), includes, without limitation, a pre-processor 230(0), a wavelet transform 240(0), a multilevel wavelet decomposition 250(0), and a feature extractor 260(0). In general, the spatial information extractor 220($y$), for an integer y from 0 to 6, includes, without limitation, the pre-processor 230($y$), the wavelet transform 240($y$), the multilevel wavelet decomposition 250($y$), and the feature extractor 260($y$). The pre-processor 230 is depicted using a dashed box to indicate that the pre-processor 230 is optional.

The pre-processor 230($y$) performs any number and/or types of pre-processing operations on the heat map 210($y$). Some examples of types of pre-processing operations that the pre-processor 230($y$) can perform include, without limitation, interpolating undefined measurement values, clipping extreme measurement values, and normalizing within the heat map 210($y$). In some embodiments, the pre-processor 230($y$) is omitted from the spatial information extractor 220($y$). In the same or other embodiments, the feature engine 130, the training application 120, and/or input engine 182 can perform any number and/or types of processing operations on the heat map set 104.

After the pre-processor 230($y$) pre-processes the heat map 210($y$), the spatial information extractor 220($y$) applies the wavelet transform 240($y$) to the heat map 210($y$) to generate the multilevel wavelet decomposition 250($y$). The spatial information extractor 220($y$) can apply any type of wavelet transform 240($y$) to the heat map 210($y$) in any technically feasible fashion. For instance, in some embodiments, the spatial information extractor 220($y$) executes a function call to a 2D discrete wavelet transform function included in a wavelet transforms module. Via the function call, the spatial information extractor 220($y$) configures the 2D discrete wavelet transform function to use reflect padding to extrapolate the heat map 210($y$) before computing the Harr wavelet transform using a cascading filter banks algorithm. The function call returns the multilevel wavelet decomposition 250($y$) that includes, without limitation, approximation, horizontal detail, vertical detail and diagonal detail coefficients.

The feature extractor 260($y$) generates the spatial feature set 270($y$) based on the multilevel wavelet decomposition 250($y$). The feature extractor 260($y$) can generate the spatial feature set 270($y$) in any technically feasible fashion. In some embodiments, the feature extractor 260($y$) extracts any number and/or types of features from the multilevel wavelet decomposition 250 and then performs any number and/or type of post-processing operations on the extracted feature to generate the spatial feature set 270($y$).

For instance, in some embodiments, the feature extractor 260($y$) extracts features from the two lowest levels of the multilevel wavelet decomposition 250($y$) to generate the spatial feature set 270($y$). In some embodiments, the feature extractor 260($y$) extracts features from the two lowest levels of the multilevel wavelet decomposition 250($y$) and then normalizes each of the extracted features to generate the spatial feature set 270($y$). In other embodiments, the feature extractor 260($y$) extracts a set of features from the three lowest levels of the multilevel wavelet decomposition 250 ($y$), uses principal component analysis to compress the set of features, and sets the spatial feature set 270($y$) equal to the resulting compressed set of features. A set of features is also referred to herein as a "feature set."

As shown, the aggregation engine 280 generates the feature vector 138 based on the spatial feature sets 270(0)-270(6). The aggregation engine 280 can generate the feature vector 138 in any technically feasible fashion. For instance, in some embodiments, the aggregation engine 280 concatenates the spatial feature sets 270(0)-270(6) to generate the feature vector 138. The feature vector 138 is also referred to herein as a "set of features."

Facilitating Root Cause Analysis of Executional Artifacts

FIG. 3 is a more detailed illustration of the output engine 190 of FIG. 1, according to various embodiments. As shown, the output engine 190 includes, without limitation, the experiment summary 196 and the plate summaries 198(1)-198(E), where E can be any positive integer. The output engine 190 generates the experiment summary 196 and the plate summaries 198(1)-198(E) based on the predicted labels 186(0)-186(E), the label confidences 188(0)-188(E), the label dataset 156, and (optionally) the unlabeled training dataset 102.

The label dataset 156 includes, without limitation, labeled clusters 340(1)-340(C), where C can be any positive integer. As shown, the labeled cluster 340(C) includes, without limitation, a cluster 330(C), a cluster label 342(C), and a mean heat map set 344(C). More generally, the labeled cluster 340($z$), where z is an integer from 1 to C, includes, without limitation, the cluster 330($z$), the cluster label 342 ($z$), and the mean heat map set 344($z$). The cluster 330($z$) specifies the feature vectors 138 that are assigned to the cluster 330($z$) in any technically feasible fashion. As depicted in italics, in some embodiments, the cluster 330($z$) specifies a list of the feature vectors 138 that are assigned of the cluster 330($z$). For explanatory purposes only, the clusters 330(1)-330(C) are also referred to herein individually as "the cluster 330" and collectively as "the clusters 330." And the cluster labels 342(1)-342(C) are also referred to herein individually as "the cluster label 342" and collectively as "the cluster labels 342."

As described previously herein in conjunction with FIG. 1, the predicted label 186(0) and the label confidence 188(0) are associated with a nonexistent, average microwell plate associated with the experiment that is conducted via the microwell plates 1-E. The predicted labels 186(1)-186(E) and the label confidences 188(1)-188(E) are associated with the microwell plates 1-E, respectively. Each of the predicted labels 186(0)-186(E) is equal to one of the cluster labels 342(1)-342(C) and may differ from any number of the other predicted labels 186.

As shown, in some embodiments, the experiment summary 196 includes, without limitation, the predicted label 186(0), the label confidence 188(0), and a matching plate fraction 310. The output engine 190 can compute the matching plate fraction 310 in any technically feasible fashion. For instance, in some embodiments, the output engine 190 sets the matching plate fraction equal to the percentage of the predicted labels 186(1)-186(E) that are equal to the predicted label 186(0).

The plate summary 198($x$), for an integer x from 1 to E, includes, without limitation, the predicted label 186($x$), the label confidence 188($x$), and an anomaly score 320($x$). The anomaly score 320($x$) indicates how outlying the microwell plate x is with respect to the cluster 330 associated with the predicted label 186(*x*). The output engine 190 can compute the anomaly score 320(*x*) in any technically feasible fashion.

For explanatory purposes only, in some embodiments, the predicted label 186(1) is equal to the cluster label 342(C) "row failure," and the output engine 190 sets the anomaly score 320(*x*) equal to a dissimilarity between the feature vector 138(*x*) and the feature vector 138 associated with the mean heat map set 344(C). The output engine 190 can compute the feature vector 138 associated with the mean heat map set 344(C) and the dissimilarity between the feature vector 138(*x*) and the feature vector 138 associated with the mean heat map set 344(C) in any technically feasible fashion.

As shown, in some embodiments, the output engine 190 generates and displays the analysis GUI 192. For explanatory purposes only, the analysis GUI 192 is depicted at a specific point in time based on exemplary user inputs. As shown, the analysis GUI 192 includes, without limitation, a plate slider 370 that is configured to select none of the microwell plates, a cluster slider 380 that is configured to select the labelled cluster 340(C) that is associated with the cluster label 342(C) row failure, and a cluster viewing pane 390.

Because the cluster slider 380 is configured to select the labelled cluster 340(C), the output engine 190 populates the cluster viewing pane 390 with information associated with the labelled cluster 340(C). As shown, the output engine 190 displays the mean heat map set 344(C) and specifies that a subset of the microwell plates included in the experiment associated with the experiment dataset 106 are assigned to the cluster 330(C) having the cluster label 342(C) of row failure. More specifically, the output engine 190 specifies that the subset of microwell plates that includes the microwell plates 1, 3, 45-52, and 58 is associated with the cluster label 342(C) and the mean heat map set 344(C).

As illustrated in FIG. 3, the mean heat map set 344(C) includes the heat maps 210(0)-210(6) that visually depict the mean cell count and the mean intensities for imaging channels 1-6 for the 148 microwell plates that were assigned to the cluster 330(C) by the training application 120. In each of the heat maps 210 that are depicted in FIG. 3, the measurement values in the fourth row from the bottom are abnormally low and are executional artifacts associated with a row failure.

Based on the cluster viewing pane 390, the measurement values associated with the microwell plates 1, 3, 45-52, and 58 can be excluded from the experiment dataset 106. Furthermore, a root cause analysis could conclude that a particular dispensing nozzle was partially clogged.

Figure 4:
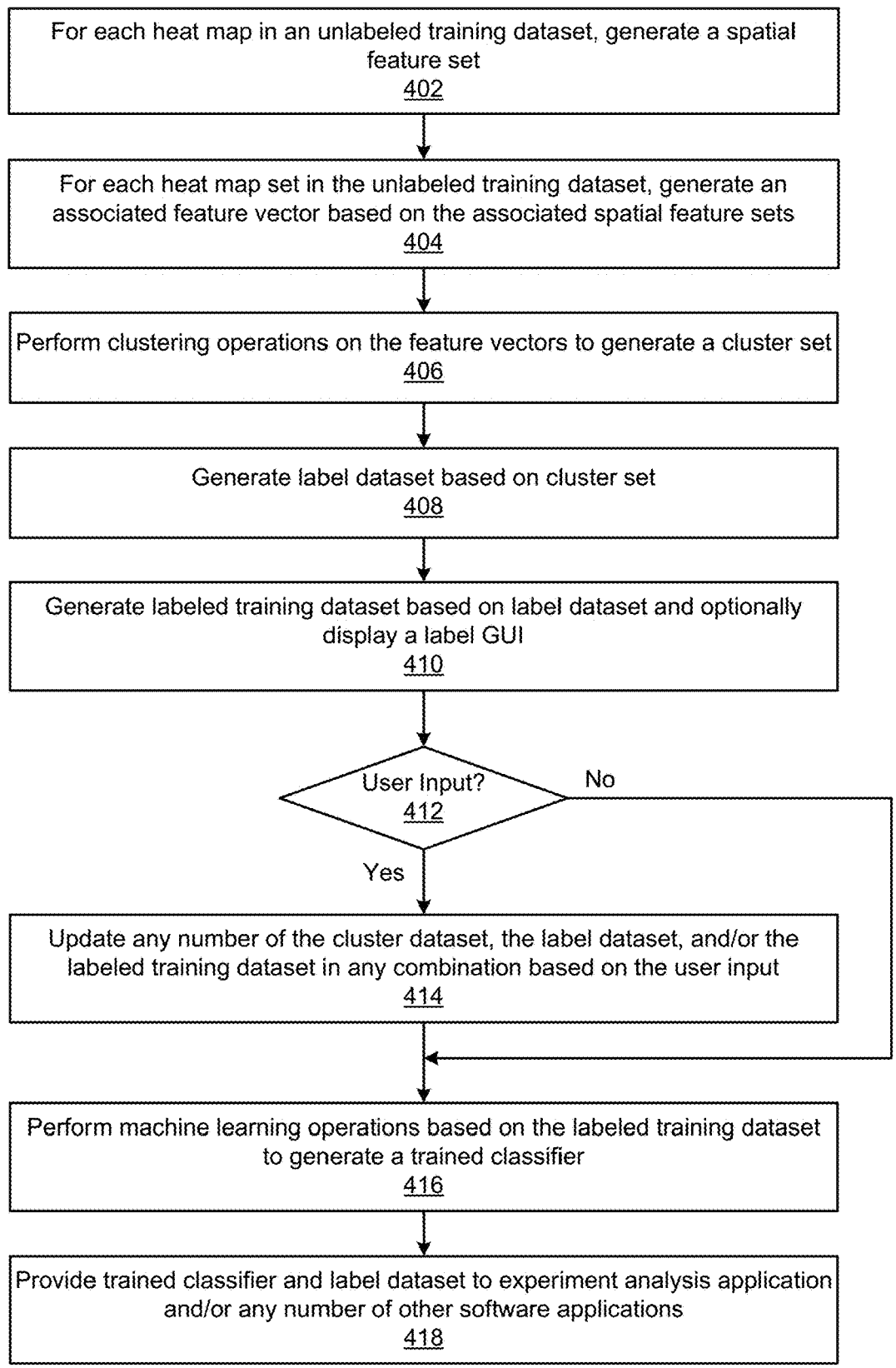
FIG. 4 is a flow diagram of method steps for training a classifier to detect executional artifacts in experiments involving microwell plates, according to various embodiments.

FIG. 4 is a flow diagram of method steps for training a classifier to identify executional artifacts in experiments involving microwell plates, according to various embodiments. Although the method steps are described with reference to the systems of FIGS. 1-3, persons skilled in the art will understand that any system configured to implement the method steps, in any order, falls within the scope of the present invention.

As shown, a method 400 begins a step 402, where, for each of the heat maps 210 included in the unlabeled training dataset 102, the spatial information extractor 220 generates a different spatial feature set 270. At step 404, for each of the heat map sets 104(*x*), where x is an integer between 1 and H, included in the unlabeled training dataset 102, the aggregation engine 280 generates the associated feature vector 138(*x*) based on the spatial feature sets 270 associated with the heat map set 104(*x*).

At step 406, the clustering engine 140 executes clustering operations based on the feature vectors 138(1)-138(H) to generate the cluster set 148. At step 408, the labeling engine 150 generates the label dataset 156 based on the cluster set 148. At step 410, the labeling engine 150 generates the labeled training dataset 158 based on the label dataset 156 and, optionally, displays the label GUI 152.

At step 412, the labeling engine 150 determines whether the labeling engine 150 has received any input via the label GUI 152. If, at step 412, the labeling engine 150 determines that the labeling engine 150 has not received any input via the label GUI 152, then the method 400 proceeds directly to step 416.

If, however, at step 412, the labeling engine 150 determines that the labeling engine 150 has received input via the label GUI 152, then the method 400 proceeds to step 414. At step 414, the labeling engine 150 updates any number of the cluster set 148, the label dataset 156, and/or the labeled training dataset 158 in any combination based on the input.

At step 416, the training engine 160 performs machine learning operations based on the labeled training dataset 158 to generate the trained classifier 170. As referred to herein, a machine learning operation can be any type of operation that is executed by and/or associated with software that learns from experience and/or can access data and use the data to learn. Some examples of machine learning operations includes, without limitation, unsupervised machine learning operations, supervised machine learning operations, semi-supervised machine learning operations, and reinforcement learning operations.

At step 418, the training application 120 provides the trained classifier 170 and the label dataset 156 to the experiment analysis application 180 and/or any number of other software applications. In some embodiments, the training application 120 also provides the unlabeled training dataset 102 to the experiment analysis application 180 and/or any number of other software applications. The method 400 then terminates.

Figure 5:
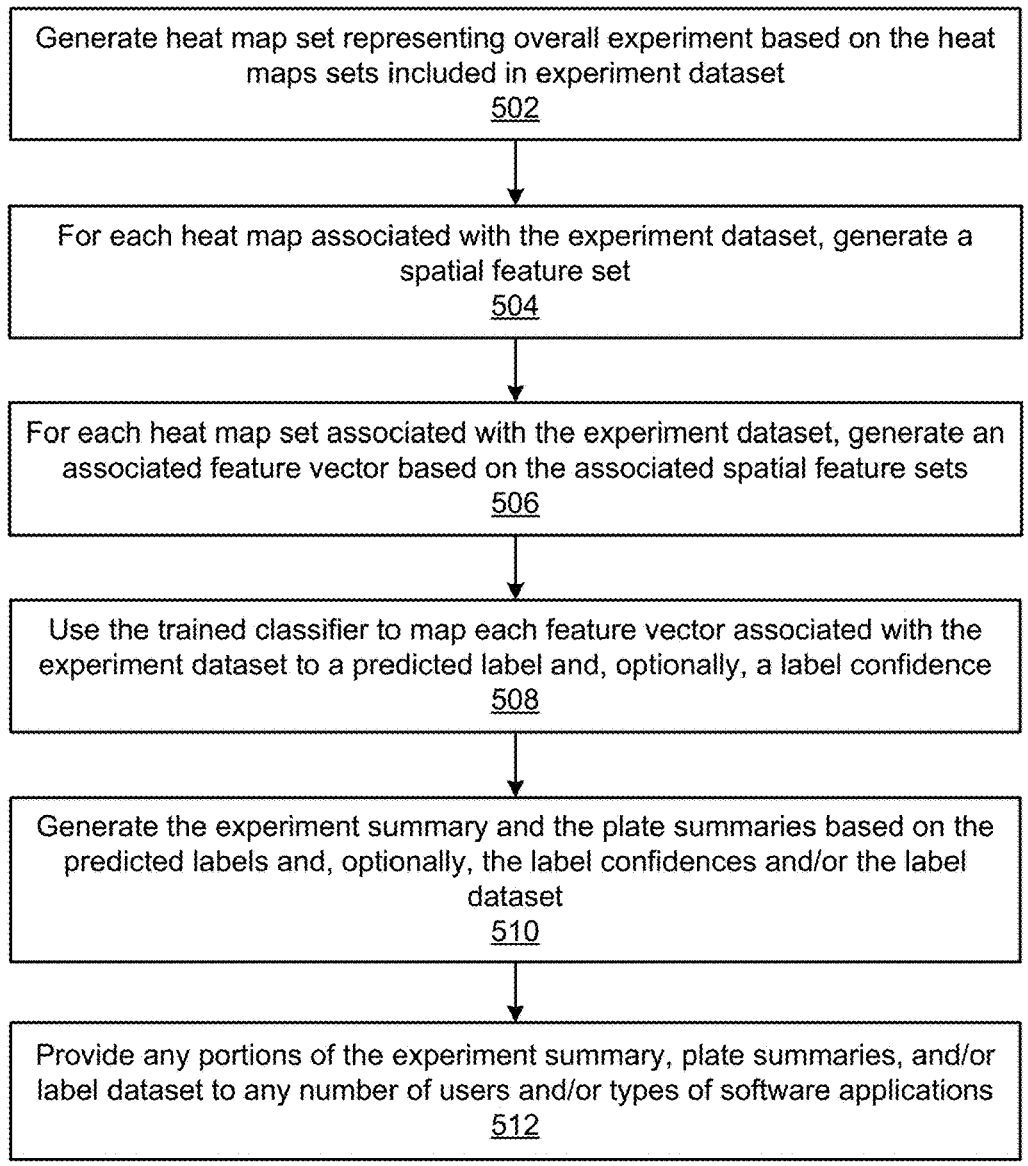
FIG. 5 is a flow diagram of method steps for detecting executional artifacts in experiments involving microwell plates using a trained classifier, according to various embodiments.

FIG. 5 is a flow diagram of method steps for detecting executional artifacts in experiments involving microwell plates using a trained classifier, according to various embodiments. Although the method steps are described with reference to the systems of FIGS. 1-3, persons skilled in the art will understand that any system configured to implement the method steps, in any order, falls within the scope of the present invention.

As shown, the method 500 begins at step 502, where the input engine 182 generates the heat map set 104(0') representing an overall experiment based on the heat map sets 104(1')-104(E') included in the experiment dataset 106. At step 504, for each of the heat maps 210 associated with the experiment dataset 106, the spatial information extractor 220 generates a different spatial feature set 270. At step 506, for each of the heat map sets 104(*x'*), where x is an integer between 0 and E, the aggregation engine 280 generates the associated feature vector 138(*x'*) based on the spatial feature sets 270 associated with the heat map set 104(*x'*).

At step 508, the experiment analysis application 180 uses the trained classifier 170 to map each of the feature vectors 138(*x'*), where x is an integer between 0 and E, to the predicted label 186(*x*) and, optionally, the label confidence 188(*x*). At step 510, the output engine 190 generates the experiment summary 196 and the plate summaries 198(1)-198(E) based on the predicted labels 186(0)-186(E) and, optionally, the label confidences 188(0)-188(E) and/or the label dataset 156. At step 512, the experiment analysis application 180 provides any portions of any number of the experiment summary 196, the plate summaries 198(1)-198 (E), and/or the label dataset 156 in any combination to any number and/or types of software applications. The method 500 then terminates.

In sum, the disclosed techniques can be used to train a classifier to accurately and consistently detect executional anomalies in experiments involving microwell plates. In some embodiments, a training application generates the trained classifier based on an unlabeled training dataset. The unlabeled training dataset includes, without limitation, any number of heat maps sets, where each heat map set represents measurement values associated with a different microwell plate. The training application includes, without limitation, a feature engine, a clustering engine, a labeling engine, and a training engine. The training application configures the feature engine to generate a feature vector for each heat map set included in the unlabeled training dataset.

To generate the feature vector for a given heat map set, the feature engine applies a wavelet transform to each of the heat maps included in the heat map set to generate multilevel wavelet decompositions. The feature engine then extracts features from the two lowest levels of each of the multilevel wavelet decompositions to generate spatial feature sets. The feature engine aggregates the spatial feature sets to generate the feature vector associated with the heat map set.

The clustering engine executes an agglomerative clustering algorithm based on the feature vectors to generate a cluster set that includes, without limitation, any number of clusters of feature vectors. The labeling engine generates a label dataset that includes, without limitation, a labeled cluster for each cluster. Each labeled cluster includes, without limitation, the associated cluster, a cluster label, and a mean heat map set representing the cluster. The labeling engine optionally displays a label GUI. The labeling engine can update the label dataset based on input received via the label GUI.

The labeling engine generates a labeled training dataset based on the label dataset. The labeled training dataset includes, without limitation, each of the feature vectors and the associated cluster label. Based on the labeled training dataset, the training engine trains a classifier to map a feature vector to a predicted label (i.e., one of the cluster labels) and an associated label confidence. The training application transmits the trained classifier and, optionally, the label dataset to an experiment analysis application and/or any number of other software applications.

In some embodiments, the experiment analysis application uses the trained classifier and the label dataset to detect and assess executional anomalies in an experiment dataset. The experiment dataset is associated with an experiment conducted using microwell plates and includes, without limitation, any number of heat map sets. Each heat map set represents measured values associated with a different microwell plate. The experiment analysis application includes, without limitation, an input engine, the feature engine, the trained classifier, and an output engine.

The input engine generates an "average" heat map set based on the experiment dataset and then uses the feature engine to generate a feature vector for the average heat map set. The input engine also uses the feature engine to generate a feature vector for each of the heat map sets included in the experiment dataset. The experiment analysis engine inputs each of the feature vectors into the trained classifier to generate a predicted label and a label confidence. Subsequently, the output engine generates plate summaries and an experiment summary based on the predicted labels, the label confidences, and the label dataset.

Each plate summary is associated with a different microwell plate and includes, without limitation, the predicted label for the associated feature vector, the associated label confidence, and an anomaly score. The anomaly score indicates how outlying the microwell plate is with respect to the cluster associated with the predicted label. The experiment summary represents the overall experiment and includes, without limitation, the "average" predicted label for the feature vector associated with the average heat map set, the associated label confidence, and a matching plate fraction. The matching plate fraction specifies the percentage of the microwell plates associated with the experiment dataset having predicted labels that are equal to the average predicted label. The experiment analysis application provides any number of software applications and/or displays via an analysis GUI any portions of any number of the plate summaries, the experiment summary, and/or the label dataset.

At least one technical advantage of the disclosed techniques relative to the prior art is that the experiment analysis application can use the trained classifier to more accurately and consistently analyze and detect executional artifacts in experiments involving microwell plates. Because the experiment analysis application uses the trained classifier to automatically classify microwell plates based on spatial patterns in associated heat maps, the likelihood that executional anomalies reflected in the heat maps are overlooked or misinterpreted is reduced relative to prior art approaches. Furthermore, computing anomaly scores and mean heat map sets for each cluster facilitates both root cause analyses and the identification of new types of executional artifacts. Unlike prior art approaches, the trained classifier objectively and consistently classifies the microwell plates with respect to executional anomalies over time and different experiments. Consequently, trends in the executional anomalies can be efficiently detected and used to improve experimental processes and/or equipment. These technical advantages provide one or more technological improvements over prior art approaches.

1. In some embodiments, a computer-implemented method for detecting executional artifacts in experiments involving microwell plates comprises computing one or more sets of spatial features based on one or more heat maps associated with a first microwell plate, aggregating the one or more sets of spatial features to generate a first feature vector, and inputting the first feature vector into a trained classifier that, in response, generates a first label indicating that the first microwell plate is associated with a first executional artifact.

2. The computer-implemented method of clause 1, further comprising computing an anomaly score based on the first feature vector and a first cluster of feature vectors associated with the first label.

3. The computer-implemented method of clauses 1 or 2, further comprising computing a second feature vector that is associated with an experiment based on a plurality of heat maps, wherein the plurality of heat maps includes the one or more heat maps associated with the first microwell plate, and inputting the second feature vector into the trained classifier that, in response, generates a second label that classifies the experiment with respect to a plurality of labels that includes the first label.

4. The computer-implemented method of any of clauses 1-3, further comprising computing a second feature vector that is associated with an experiment based on a plurality of microwell plates that includes the first microwell plate, inputting the second feature vector into the trained classifier that, in response, generates the first label, and computing a percentage that indicates how many microwell plates included in the plurality of microwell plates are associated with the first label.

5. The computer-implemented method of any of clauses 1-4, further comprising determining that a subset of microwell plates associated with an experiment are also associated with the first label, wherein the subset of microwell plates includes the first microwell plate, and displaying a mean heat map associated with the first label via a graphical user interface ("GUI"), and generating an indication via the GUI that the subset of microwell plates is associated with the mean heat map.

6. The computer-implemented method of any of clauses 1-5, further comprising generating an indication via a GUI that the first label is associated with the one or more heat maps.

7. The computer-implemented method of any of clauses 1-6, wherein the trained classifier further generates a label confidence that indicates a likelihood that the first label applies to the first microwell plate.

8. The computer-implemented method of any of clauses 1-7, wherein computing the one or more sets of spatial features comprises applying a wavelet transform to a first heat map included in the one or more heat maps to generate a multilevel wavelet decomposition, and extracting a first set of spatial features from at least the lowest level of the multilevel wavelet decomposition.

9. The computer-implemented method of any of clauses 1-8, wherein a first heat map included in the one or more heat maps specifies a plurality of intensities, and each intensity included in the plurality of intensities is associated with a different well that is included in the first microwell plate.

10. The computer-implemented method of any of clauses 1-9, wherein the trained classifier comprises a random forest, a neural network, a decision tree, or a support vector machine trained via one more or inductive clustering operations.

11. In some embodiments, one or more non-transitory computer readable media include instructions that, when executed by one or more processors, cause the one or more processors to detect executional artifacts in experiments involving microwell plates by performing the steps of computing one or more sets of spatial features based on one or more measurement value arrays associated with a first microwell plate, generating a first feature vector based on the one or more sets of spatial features, and inputting the first feature vector into a trained machine learning model that, in response, generates a first label indicating that the first microwell plate is associated with a first executional artifact.

12. The one or more non-transitory computer readable media of clause 11, further comprising computing an anomaly score based on the first feature vector and a first cluster of feature vectors associated with the first label.

13. The one or more non-transitory computer readable media of clauses 11 or 12, further comprising computing a second feature vector that is associated with an experiment based on a plurality of measurement value arrays, wherein the plurality of measurement value arrays includes the one or more measurement value arrays associated with the first microwell plate, and inputting the second feature vector into the trained machine learning model that, in response, generates a second label that classifies the experiment with respect to a plurality of labels that includes the first label.

14. The one or more non-transitory computer readable media of any of clauses 11-13, further comprising computing a second feature vector that is associated with an experiment based on a plurality of microwell plates that includes the first microwell plate, inputting the second feature vector into the trained machine learning model that, in response, generates the first label, and computing a percentage that indicates how many microwell plates included in the plurality of microwell plates are associated with the first label.

15. The one or more non-transitory computer readable media of any of clauses 11-14, further comprising determining that a subset of microwell plates associated with an experiment are also associated with the first label, wherein the subset of microwell plates includes the first microwell plate, and displaying a mean measurement value array associated with the first label via a graphical user interface ("GUI"), and generating an indication via the GUI that the subset of microwell plates is associated with the mean measurement value array.

16. The one or more non-transitory computer readable media of any of clauses 11-15, wherein computing the one or more sets of spatial features comprises applying a wavelet transform to a first measurement value array included in the one or more measurement value arrays to generate a multilevel wavelet decomposition, and extracting a first set of spatial features from at least the lowest level of the multilevel wavelet decomposition.

17. The one or more non-transitory computer readable media of any of clauses 11-16, wherein computing the one or more sets of spatial features comprises computing first spatial information based on a first measurement value array included in the one or more measurement value arrays, and extracting a first set of low frequency spatial features from the first spatial information.

18. The one or more non-transitory computer readable media of any of clauses 11-17, wherein a first measurement value array included in the one or more measurement value arrays specifies a plurality of cell counts, and each cell count included in the plurality of cell counts is associated with a different well that is included in the first microwell plate.

19. The one or more non-transitory computer readable media of any of clauses 11-18, wherein the first microwell plate is associated with a first experiment, and a second microwell plate is associated with a second experiment as well as a second feature vector, and further comprising inputting the second feature vector into the trained machine learning model that, in response, generates a second label indicating that the second microwell plate is associated with a second executional artifact.

20. In some embodiments, a system comprises one or more memories storing instructions, and one or more processors coupled to the one or more memories that, when executing the instructions, perform the steps of computing a plurality of spatial features based on a plurality of measurement values associated with a first microwell plate, generating a set of features based on the plurality of spatial features, and computing a first label based on the set of features and a trained machine learning model, wherein the first label indicates that the first microwell plate is associated with a first executional artifact.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

As previously set forth herein, aspects of the present disclosure may take the form of a computer program product embodied in one or more computer readable media having computer readable program codec embodied thereon. Any combination of one or more computer readable media may be utilized Each computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, or a Flash memory), an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting executional artifacts in experiments involving microwell plates, the method comprising:
   computing one or more sets of spatial features based on one or more heat maps associated with a first microwell plate, wherein a first heat map included in the one or more heat maps comprises a plurality of values that are associated with a plurality of wells of the first microwell plate;
   generating a first feature vector based on the one or more sets of spatial features; and
   inputting the first feature vector into a trained classifier that, in response, generates a first label indicating that the first microwell plate is associated with a first executional artifact.

2. The computer-implemented method of claim 1, further comprising computing an anomaly score based on the first feature vector and a first cluster of feature vectors associated with the first label.

3. The computer-implemented method of claim 1, further comprising:
   computing a second feature vector that is associated with an experiment based on a plurality of heat maps, wherein the plurality of heat maps includes the one or more heat maps associated with the first microwell plate; and
   inputting the second feature vector into the trained classifier that, in response, generates a second label that classifies the experiment with respect to a plurality of labels that includes the first label.

4. The computer-implemented method of claim 1, further comprising:
   computing a second feature vector that is associated with an experiment based on a plurality of microwell plates that includes the first microwell plate;
   inputting the second feature vector into the trained classifier that, in response, generates the first label; and
   computing a percentage that indicates how many microwell plates included in the plurality of microwell plates are associated with the first label.

5. The computer-implemented method of claim 1, further comprising:
   determining that a subset of microwell plates associated with an experiment are also associated with the first label, wherein the subset of microwell plates includes the first microwell plate; and
   displaying a mean heat map associated with the first label via a graphical user interface ("GUI"); and
   generating an indication via the GUI that the subset of microwell plates is associated with the mean heat map.

6. The computer-implemented method of claim 1, further comprising generating an indication via a GUI that the first label is associated with the one or more heat maps.

7. The computer-implemented method of claim 1, wherein the trained classifier further generates a label confidence that indicates a likelihood that the first label applies to the first microwell plate.

8. The computer-implemented method of claim 1, wherein computing the one or more sets of spatial features comprises:
applying a wavelet transform to the first heat map to generate a multilevel wavelet decomposition; and
extracting a first set of spatial features from at least a lowest level of the multilevel wavelet decomposition.

9. The computer-implemented method of claim 1, wherein the first heat map comprises a plurality of intensity values, and each intensity value included in the plurality of intensity values is associated with a different well that is included in the first microwell plate.

10. The computer-implemented method of claim 1, wherein the trained classifier comprises a random forest, a neural network, a decision tree, or a support vector machine trained via one more or inductive clustering operations.

11. One or more non-transitory computer readable media including instructions that, when executed by one or more processors, cause the one or more processors to detect executional artifacts in experiments involving microwell plates by performing the steps of:
computing one or more sets of spatial features based on one or more measurement value arrays associated with a first microwell plate, wherein a first measurement value array included in the one or more measurement value arrays comprises a plurality of values that are associated with a plurality of wells of the first microwell plate;
generating a first feature vector based on the one or more sets of spatial features; and
inputting the first feature vector into a trained machine learning model that, in response, generates a first label indicating that the first microwell plate is associated with a first executional artifact.

12. The one or more non-transitory computer readable media of claim 11, wherein the instructions, when executed by the one or more processors, further cause the one or more processors to perform the step of computing an anomaly score based on the first feature vector and a first cluster of feature vectors associated with the first label.

13. The one or more non-transitory computer readable media of claim 11, wherein the instructions, when executed by the one or more processors, further cause the one or more processors to perform the steps of:
computing a second feature vector that is associated with an experiment based on a plurality of measurement value arrays, wherein the plurality of measurement value arrays includes the one or more measurement value arrays associated with the first microwell plate; and
inputting the second feature vector into the trained machine learning model that, in response, generates a second label that classifies the experiment with respect to a plurality of labels that includes the first label.

14. The one or more non-transitory computer readable media of claim 11, wherein the instructions, when executed by the one or more processors, further cause the one or more processors to perform the steps of:
computing a second feature vector that is associated with an experiment based on a plurality of microwell plates that includes the first microwell plate;
inputting the second feature vector into the trained machine learning model that, in response, generates the first label; and
computing a percentage that indicates how many microwell plates included in the plurality of microwell plates are associated with the first label.

15. The one or more non-transitory computer readable media of claim 11, wherein the instructions, when executed by the one or more processors, further cause the one or more processors to perform the steps of:
determining that a subset of microwell plates associated with an experiment are also associated with the first label, wherein the subset of microwell plates includes the first microwell plate; and
displaying a mean measurement value array associated with the first label via a graphical user interface ("GUI"); and
generating an indication via the GUI that the subset of microwell plates is associated with the mean measurement value array.

16. The one or more non-transitory computer readable media of claim 11, wherein computing the one or more sets of spatial features comprises:
applying a wavelet transform to the first measurement value array to generate a multilevel wavelet decomposition; and
extracting a first set of spatial features from at least a lowest level of the multilevel wavelet decomposition.

17. The one or more non-transitory computer readable media of claim 11, wherein computing the one or more sets of spatial features comprises:
computing first spatial information based on the first measurement value array; and
extracting a first set of low frequency spatial features from the first spatial information.

18. The one or more non-transitory computer readable media of claim 11, wherein the first measurement value array comprises a plurality of cell counts, and each cell count included in the plurality of cell counts is associated with a different well that is included in the first microwell plate.

19. The one or more non-transitory computer readable media of claim 11, wherein the first microwell plate is associated with a first experiment, and a second microwell plate is associated with a second experiment as well as a second feature vector, and the instructions, when executed by the one or more processors, further cause the one or more processors to perform the step of inputting the second feature vector into the trained machine learning model that, in response, generates a second label indicating that the second microwell plate is associated with a second executional artifact.

20. A system comprising:
one or more memories storing instructions; and
one or more processors coupled to the one or more memories that, when executing the instructions, perform the steps of:
computing a plurality of spatial features based on a plurality of measurement values associated with a first microwell plate, wherein the plurality of measurement values are associated with a plurality of wells of the first microwell plate,
generating a set of features based on the plurality of spatial features, and
computing a first label based on the set of features and a trained machine learning model, wherein the first label indicates that the first microwell plate is associated with a first executional artifact.

* * * * *